United States Patent [19]

Humble

[11] Patent Number: 4,949,256

[45] Date of Patent: Aug. 14, 1990

[54] COUPON VALIDATION NETWORK WITH STORAGE OF CUSTOMER COUPON DATA FOR CREDIT ON FUTURE PURCHASES

[76] Inventor: David R. Humble, 2696 Emerald Way N., Deerfield Beach, Fla. 33441

[21] Appl. No.: 190,764

[22] Filed: May 6, 1988

[51] Int. Cl.⁵ .............................................. G06F 15/21
[52] U.S. Cl. .................................. 364/401; 235/487; 364/405
[58] Field of Search ...................... 235/381, 385, 487; 364/401, 405

[56] References Cited

U.S. PATENT DOCUMENTS

| | | | |
|---|---|---|---|
| 3,959,624 | 5/1976 | Kaslow | 235/487 |
| 4,348,551 | 9/1982 | Nakatani et al. | 179/1 SM |
| 4,554,446 | 11/1985 | Murphy | 235/487 |
| 4,658,125 | 4/1987 | Kachi et al. | 235/449 |
| 4,674,041 | 6/1987 | Lemon | 235/381 |
| 4,676,343 | 6/1987 | Humble et al. | 186/61 |
| 4,723,212 | 2/1988 | Mindrum | 235/385 |
| 4,833,308 | 5/1989 | Humble | 235/383 |

FOREIGN PATENT DOCUMENTS

86/03310 6/1986 World Int. Prop. O. .

Primary Examiner—Jerry Smith
Assistant Examiner—Gail O. Hayes
Attorney, Agent, or Firm—Eckert Seamans Cherin & Mellott

[57] ABSTRACT

A coupon validation network is disclosed for automatically processing product coupons which are presented for redemption by customers. The coupon validation network includes: a central control systems storing at least two database master files, a first file for all redeemable encoded coupons issued by all manufacturers participating in the network and a second file for all coupons redeemed by each retailer participating in the network. A plurality of local control systems for operation by one of the retailers store and at least three database local files, a first file of all the redeemable encoded coupons, a second file for all coupons redeemed by the retailer and a third file for customer coupon accounts of all validated redeemable coupons presented in advance for credit by each customer. A first coupon processing terminal for use in conjunction with an electronic sales register and the like adjusts a total purchase price to reflect all valid redeemed coupons and updates the second local database file. A second coupon processing terminal adapted for independent use by customers identifies all valid coupons presented in advance for later redemption credit. Data is transferred between the at least one central control system and the plurality of local control system. Retailers automatically process coupons presented for redemption by customers, manufacturers may conveniently reimburse retainers for the value of the redeemed coupons and customers can arrange for permanent access to their coupons without carrying them, the coupons being discardable after redemption for purchase or credit.

6 Claims, 1 Drawing Sheet

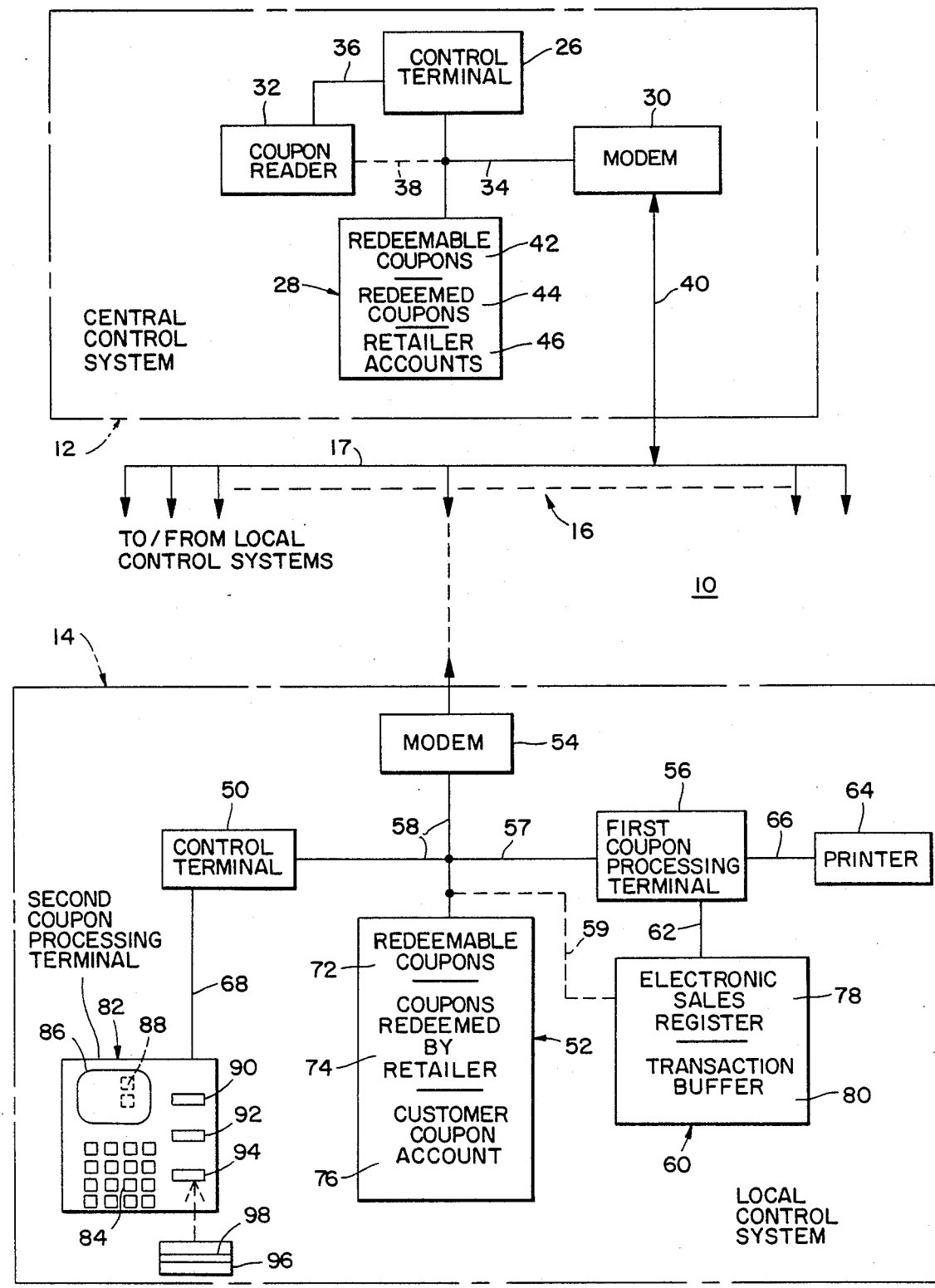

COUPON VALIDATION NETWORK WITH STORAGE OF CUSTOMER COUPON DATA FOR CREDIT ON FUTURE PURCHASES

BACKGROUND OF THE INVENTION

1. Field of the Invention

This invention relates generally to the field of retail marketing promotions, and in particular, to a comprehensive coupon validation network for efficiently monitoring and controlling all phases of coupon processing.

2. Prior Art

Coupons, for example cents-off, two-for-one and the like, have become an integral part of retail marketing, particularly for food and pharmaceutical products. Most coupons are issued by the manufacturers of the products, although retail stores, particularly retail store chains, will often issue coupons as well. Presently, printed coupons are collected by consumers, often in quantities of hundreds or even thousands of small pieces of paper. Most consumers are unable to say, with any assurance, just what products may be purchased at a discount by reason of the coupons on hand. As a consequence, most consumers usually find that several coupons have been left at home, some time during shopping or checking out.

The coupons are presented for redemption at the cash register when checking-out a group of purchases. Even in those instances where electronic scanners and electronic sales registers are available, a cashier must manually examine each coupon individually. The examination must include checking the expiration date of the coupon, whether or not the consumer has actually purchased the product identified on the coupon and, frequently, whether the consumer has purchased the correct quantity of products and the correct size of the product. Thereafter, the values of the manually validated coupons must be entered into the register for subtraction from the unadjusted aggregate purchase price.

Those coupons which are collected by the retailers must be manually sorted, and returned to the manufacturers. The sorting is usually done by a professional clearing house, but is sometimes done by the retailer or retail chain. In either case, the coupons must be sorted both by manufacturer and by retailer, in order for each retailer to receive proper reimbursement from each manufacturer. The manufacturers must pay fees to the clearing houses and must pay handling fees to the retailers, which increases the cost of the product promotions. The retailers incur an additional cost by reason of extending credit to the manufacturers by underwriting the discount values of the coupons at the time of purchase and being reimbursed at a later time.

The current system is not only too expensive, it is something of an administrative nightmare to collect, sort, shuffle and transport millions and millions of small pieces of paper. Moreover, the system is fraught with opportunities to defraud the manufacturers by presenting coupons for reimbursement which have not been presented in conjunction with purchasing a product. Once a coupon has reached a sorting stage it is impossible for a manufacturer to determine whether a specific product was purchased with that coupon. Such frauds are usually undetectable unless perpetrated by large conspiracies with many participants.

The supermarket industry, in particular, has already begun adding universal product codes (UPC) to coupons. The coupons are encoded to enable machine scanning of the coupons at the point of purchase, that is, by the cashier. As the coupon is scanned, it may be checked against a database file to ensure that it is a valid coupon, for which the consumer should receive a credit. Although coupon scanning technology is available, the coupons must still be manually checked against the products purchased. Moreover, most retailers do not have the necessary computer capacity to store a file of all redeemable coupons, and most retailers do not want the burden of operating a data processing center, which would be necessary to maintain current coupon files.

This invention overcomes all of the problems plaguing the prior art, as identified above. This invention provides a comprehensive coupon validation network which eases the burdens of the manufacturers, the retailers and the consumers. Firstly, the invention provides an electronic system to replace the manual system. Once coupons have been presented to a retailer, and validated, the coupons may be discarded. The coupons may be automatically invalidated to prevent subsequent revalidation and/or destroyed. Secondly, payments to the retailers from the manufacturers are made more promptly because validation is completed at the point and the time of sale. Thirdly, fraudulent redemption is eliminated because validation requires simultaneous satisfaction of the validation criteria, namely a properly redeemable coupon and a corresponding purchased product of the correct size and quantity, the validation being conducted automatically without manual intervention. Fourthly, retailers are provided with a means for maintaining an up-to-date file of redeemable coupons without having to establish or maintain a data processing center. Fifthly, operating costs of the store can be further reduced because consumers may process coupons for redemption and validation in advance, completely independently and apart from point and time of sale transactions. Finally, consumers may establish a coupon credit account which makes it unnecessary to maintain large numbers of coupons. The coupon credit account can be tapped fully and automatically at the time of each point of sale transaction to ensure that all coupons available will be utilized, ending the aggravation of forgotten coupons.

SUMMARY OF THE INVENTION

It is an object of this invention to provide a coupon validation network for automatically processing redeemed coupons.

It is a further object of this invention to provide a coupon validation network for automatically validating coupons presented for redemption by customers at the time and point of sale.

It is a another object of this invention to provide a coupon validation network for automatically validating coupons presented in advance by customers for later redemption credit.

It is yet another object of this invention to provide a coupon validation network for automatically providing retailers access to a complete database file of all redeemable coupons issued by all manufacturers participating in the network.

It is yet another object of this invention to provide a coupon validation network for automatically crediting customer's coupons toward the purchase price of a plurality of products, any one of which may or may not be subject to a price reduction upon redemption of a coupon.

It is yet another object of this invention to provide a coupon validation network for automatically providing retailers and manufacturers access to a database of all valid coupons redeemed by each retailer participating in the network, for each manufacturer participating in the network.

It is yet another object of this invention to provide a coupon validation network for automatically providing each customer participating in the network access to a database file of all coupon credits available to each customer.

It is yet another object of this invention to provide a coupon validation network for obviating the need to manually process and sort coupons after redemption thereof.

These and other objects of this invention are accomplished by a coupon validation network, comprising: at least one central control system, having means for storing at least two database master files, a first file for all redeemable encoded coupons issued by all manufacturers participating in the network and a second file for all coupons redeemed by each retailer participating in the network; a plurality of local control systems, each adapted for operation by one of the retailers and having means for storing at least three database local files, a first file of all the redeemable encoded coupons, a second file for all coupons redeemed by the retailer and a third file for customer coupon accounts of all validated redeemable coupons presented in advance for credit by each customer; at least one first coupon processing terminal adapted for use in conjunction with an electronic sales register and the like and having means for effecting adjustment of a total purchase price to reflect all valid redeemed coupons and means for updating the second local database file; at least one second coupon processing terminal adapted for independent use by customers and having means for identifying all valid coupons, presented in advance for later redemption credit, and means for updating the third local database file; and, means for transferring data between the at least one central control system and the plurality of local control systems, whereby retailers may automatically process coupons presented for redemption by customers, manufacturers may conveniently reimburse retailers for the value of the redeemed coupons and customers can arrange for permanent access to their coupons without carrying them, the coupons being discardable after redemption for purchase or credit. In the presently preferred embodiment, each local control system of the network comprises a plurality of the first and second coupon processing terminals.

In the presently preferred embodiment, each of the first coupon processing terminal comprises: means for reading coupon account cards adapted for carrying by customers, each card having encoded means for uniquely identifying a coupon customer account; means for reading encoded coupons presented for redemption; means for validating the read coupons by comparison of each of the coupons with the local file of redeemable coupons and with each product purchased during a transaction for which the coupons have been presented; means for comparing each of the coupons in any one of the customer coupon accounts with each product purchased during a transaction for cashing-in coupons presented in advance; means for automatically accumulating credit values for validated coupons; means for preventing subsequent revalidation of validated coupons; means for updating the third local database file to delete cashed-in coupons and to add coupons which are presented, read and validated, but which do not correspond to any of the products purchased during the transaction; and, means for selecting between more than one coupon, including coupons presented in advance and coupons presented during the transaction, which apply to the same product.

In the presently preferred embodiment, each of the second coupon processing terminal comprises: means for reading coupon account cards adapted for carrying by customers, each card having encoded means for uniquely identifying a coupon customer account; means for reading encoded coupons presented for redemption; means for validating the read coupons by comparison of each of the coupons with the local file of redeemable coupons; means for preventing subsequent revalidation of validated coupons; and, means for selectively displaying and printing information from each customer's coupon account.

BRIEF DESCRIPTION OF THE DRAWING

Presently preferred embodiments of the invention are shown in the drawings, it being understood, however, that the invention is not limited to the precise arrangements and instrumentalities shown.

The FIGURE is a block diagram of a coupon validation network according to this invention, some of the components or subsystems being necessary to implement a passive network and all of the components or subsystems being preferred to implement a customer interactive network.

DESCRIPTION OF THE PREFERRED EMBODIMENTS

A coupon validation network according to this invention, generally designated by reference numeral 10, is shown in the Figure. An interactive coupon validation network, that is, one in which the customers take an active, independent part, will preferably utilize all of the components or subsystems shown in the Figure. A passive coupon validation network, that is, one in which the customers do not take an active, independent part, need not utilize all of the components or subsystems. Even so, the passive system is a significant improvement over the prior art.

The coupon validation network 10 comprises at least one central control system 12, adapted for use by the operator of the network, a plurality of local control systems 14, one for each of the retailers participating on the network, and means 16 for 15 communicating and transferring data between the at least one central control system 12 and each of the local control systems 14. The communicating means 16 is illustrated as including the existing network of telephone lines 17.

Each of the at least one central control systems 12 comprises a control terminal 26, means 28 for storing at least two database master files, a modem or the like 30 and a coupon reader 32. Each central control system 12 may be embodied as a computer in which the control terminal 26, the storing means 28 and the modem 30 are interconnected by a bus 34. The control terminal will preferably have a keyboard, a video display and one or more disk or tape drives. The control terminal will also preferably have a printer. These components and features are typical of computers, and accordingly, are not shown in detail. The coupon reader 32 is preferably embodied as an external peripheral, either connected to control terminal 26 by cable 36 or to the bus 34 by cable 38, cable 38 being illustrated as an alternative connection by dotted lines. The modem 30 is connected to the telephone network lines 17 by cable 40.

The database file storing means 28 has a first file 42 for all redeemable encoded coupons issued by all manufacturers participating in the network and a second file 44 for all coupons redeemed by each retailer participating in the network. The second file 44 will be loaded and updated by information transmitted from each of the local control networks. The storing means 38 may also have a third file 46 of individual retailer 15 accounts. The information in the third file 46 may alternatively be compiled by sorting when necessary, although maintaining a permanent updatable file is believed to be more convenient.

The coupon reader 32 is adapted to have coupons fed therein, for machine scanning of the universal product codes printed thereon. The codes preferably identify the product to which the coupon pertains, the size requirement of the product if any, the amount of the coupon, the expiration date if any and the manufacturer of the product. The coupon reader may be used to load and update the first file 42 of redeemable coupons. Alternatively, the first file may be loaded and updated through the control terminal, through data stored on disks or other portable media or through the modem 30, by downloading directly from a manufacturer. Automatic paper feeders for discreet pieces of paper, which is the form taken by all conventional coupons, and machine scanners for reading universal product codes and the like are already known, and are not illustrated in detail.

Each of the local control systems 14 is adapted for operation by one of the retailers participating in the coupon validation network. Each of the local control systems preferably comprises a control terminal 50, means 52 for storing at least two database local files, a modem or the like 54, at least one first kind of coupon processing terminal 56 and at least one electronic sales register 60. A plurality of first coupon processing terminals 56 and electronic sales registers 60 will preferably be provided, for example, at each check-out location of a supermarket. Each local control system may also be embodied as a computer in which the control terminal 50, the storing means 52 and the modem 54 are interconnected by a bus 58. The first coupon processing terminal 56 and the sales register 60 are preferably embodied as external peripherals. The first coupon processing terminal 56 may be connected to the bus 58 by cable 57. The electronic sales register may be connected to the bus 58 indirectly through the first coupon processing terminal by cable 56, by means of which the coupon processing terminal 56 and the electronic sales register 60 may communicate directly with one another. The electronic sales register may also communicate directly with bus 58 by cable 59, which is shown as an alternative connection by dotted lines. A printer 64 is preferably connected to each first coupon processing terminal, as shown by cable 66. The printer may also be connected directly to either or both of the electronic sales register 60 and the bus 58, by cables which are not shown in the drawings. The foregoing components or subsystems, which will be explained in more detail, are sufficient to form a passive network, in which the customer does not take an active role.

In order to form an interactive network, in which the customer does take an active role, the local control system further comprises at least one second kind of coupon processing terminal 82, which may be connected to the control terminal by a cable 68 or may be connected directly to the bus 58 by a cable not shown in the drawing. The first coupon processing terminals 56 are adapted for use with electronic sales registers and the like, which are themselves adapted for operation by employees of the retailer. The second coupon processing terminals are adapted for independent use by customers of the retailer, and in particular, customers participating in the coupon validation network 10.

It will be appreciated by those skilled in the art that the means 16 for communicating between the at least one central control system 12 and each of the plurality of local control systems 14 may be deemed to include modems or the like 30 and 54, or not, depending upon the convenience of the definition. It will also be appreciated by those skilled in the art that the difference between that which is referred to as a peripheral and that which is referred to as an independent device is also largely a matter of convenience and definition. Accordingly, the invention is not to be limited by those definitions which have proven most convenient in describing the invention.

In each local control system 14, the storing means 52 includes at least two, and preferably at least three database local files. A first file 72 includes all of the redeemable encoded coupons. First file 72 is loaded and updated from the first file 42 of the central control system. A second file 74 includes all of the coupons redeemed by the retailer. Second file 74 is loaded and updated from one or the other of the first coupon processing terminal 56 and the electronic sales register 60, depending upon the configuration of the components and the paths by which they are connected to the storing means 52. A third file 76, necessary for implementing the interactive network, includes all customer coupon accounts of all validated redeemable coupons presented in advance for credit by each customer. Third file 76 is loaded primarily from the second coupon processing terminals 82, in the sense of adding coupon credits to an account. Third file 76 will be primarily updated, in the sense of deleting redeemed coupon credits from an account, by the first coupon processing terminals 56 and/or the electronic sales registers 60, again depending upon the system configuration. Under some circumstances, where coupons presented at the point and time of sale are validated as being properly redeemable coupons by a first coupon processing terminal, but do not correspond to a purchased product, an appropriate coupon credit may be added to a coupon account by the first coupon processing terminal and/or the electronic sales register. In the absence of such an account, or in the passive variation of the network 10, such a coupon will be returned to the customer or a substitute coupon may be printed and returned in place of the coupon.

Each of the first coupon processing terminals 56 is adapted for use in conjunction with an electronic sales register 60, as explained above. Such electronic sales registers have means for machine scanning universal product codes on products and means for calculating and accumulating a total purchase price for all products bought during a particular transaction. The use of electronic sales registers is described, for example, in U.S. Pat. No. 4,676,343, the teachings of which are incorporated herein by reference. Each of the terminals 56 has means for effecting adjustment of a total purchase price to reflect all valid redeemed coupons and means for updating the second local database file. As part of validating a coupon, it is necessary to assure that each coupon presented actually corresponds to a product being purchased as part of the transaction in which the coupon is presented for redemption. Accordingly, the sales register is provided with a transaction buffer 80 for storing all of the product codes for all of the products purchased in each transaction. Transaction buffer 80 may be alternatively incorporated into the coupon processing terminal 56, once again depending upon system configuration. Transaction buffer 80 is preferably a temporary file, erased and reloaded after each transaction is completed.

In the interactive variation, each of the second coupon processing terminals 82 will preferably have a key pad 84, a video display 86 which may be a touch-screen display having "buttons" 88, a coupon reader 90, a printer 92 and a card reader 94. Each customer participating in the interactive network will be issued an identification card 96, in the form of a common credit card. Each card 96 has a magnetic stripe or the like 98 thereon, which is encoded to identify the customer and provide access to the customer's coupon account in the third file 76. The identification process might also require the customer to punch in a code word through key pad 84 after the card has been read, as is the case with automatic teller machines. After identification has been established, a programmed display can instruct the customer on the proper procedure for feeding coupons into coupon reader 92 for adding corresponding coupon credits to the customer's coupon account. Printer 94 may be utilized to provide the customer with a list of all coupon credits which have been stored. In another mode of operation, the second terminals 82 may be used by customers to query their coupon accounts and to obtain special shopping lists of all products for which coupon credits have been stored. The list might be arranged by product category, by traffic pattern of the store, which might vary between stores in the same chain, or other convenient criteria. The list might also be printed in such a way as to flag all coupons on file which are due to expire, for example, in the next month. It is preferred that expired coupons be culled from the database files on a regular basis. Whenever customers sign on to a second terminal, they may automatically be provided with a list of all such deleted coupons.

The structure of the first coupon processing terminals will depend upon whether the network is a passive or active network. If the network is active, the first terminals 56 will be similar in all respects to the second terminals 82. Even though the first terminals 56 are adapted for use with electronic sales registers, it will still be necessary for customers to access their coupon accounts in order to redeem the coupon credit values, which now take the place of the coupons themselves Additional coupons might be presented at the time of sale as well. The retailer might also choose to automatically provide store coupon credits to a customer, depending upon the number and kind of products being purchased. A video display can provide an explanation to customers in connection with issuing the store coupon credits, in explaining why certain coupons are rejected for credit and the like. In a passive network, there need be only a coupon reader and an indicator light display, for example, to show why certain coupons are rejected.

Differences in the first and second coupon processing terminals 56 and 82 also reflects the difference in the coupon validation procedure which must be conducted by each of them. In the first processing terminals 56, two steps are required to validate coupons. The first step requires comparison of each read coupon presented at the point of sale, for both the passive and interactive networks, with the first file 72 of all redeemable coupons. The second step requires comparison of each read coupon with each product purchased, and therefore stored in transaction buffer 80. If a coupon is among those stored in first file 72, and corresponds to a product being purchased, the coupon is deemed valid. The credit value is subtracted from the unadjusted purchase price, the coupon is voided to prevent subsequent revalidation thereof and the second file 74 is updated to reflect a credit due to the retailer from the manufacturer issuing the coupon. In the interactive system, each coupon credit in the customer's coupon account must be compared with the list of purchased products stored in the transaction buffer 80. Moreover, each customer account must be updated to delete all coupon credits which have been cashed-in. Those coupons which have been redeemed may be voided by punching, shredding, obliteration of the universal product code or the like. In the second processing terminals 82, only the first step need be undertaken, namely a comparison of the read coupons with the first file 72 of redeemable coupons. The comparisons of codes on coupons with codes of stored coupons and/or the codes of purchased products may be accomplished by the same kind of equipment utilized to provide inventory control from machine scanned codes on purchased articles, and accordingly, such equipment is not described in detail herein.

In terms of function, then, each of the first coupon processing terminals preferably comprises, in the interactive variation, means for reading coupon account cards adapted for carrying by customers, each card having encoded means for uniquely identifying a coupon customer account; means for reading encoded coupons presented for redemption; means for validating the read coupons by comparison of each of the coupons with the local file of redeemable coupons and with each product purchased during a transaction for which the coupons have been presented; means for comparing each of the coupons in any one of the customer coupon accounts with each product purchased during a transaction for cashing-in coupons presented in advance; means for automatically accumulating credit values for validated coupons; means for preventing subsequent revalidation of validated coupons; means for updating the third local database file to delete cashed-in coupons and to add coupons which are presented, read and validated, but which do not correspond to any of the products purchased during the transaction; and, means for selecting between more than one coupon, including coupons presented in advance and coupons presented during the transaction, which apply to the same product.

Each of the second coupon processing terminals in an interactive network comprises, in terms of function, means for reading coupon account cards adapted for carrying by customers, each card having encoded means for uniquely identifying a coupon customer account; means for reading encoded coupons presented for redemption; means for validating the read coupons by comparison of each of the coupons with the local file of redeemable coupons; means for preventing subsequent revalidation of validated coupons; and, means for selectively displaying and printing information from each customer's coupon account.

Although the coupon validation network according to this invention requires communication between the central control system and each of the local control systems, such communication need not be on a continuous basis. Downloading of the redeemable coupon file from the central control system to the local control systems will likely be sufficient if conducted periodically, for example, on a daily or even a weekly basis. Downloading of each second file of coupons redeemed by each retailer from the local control centers to the central control center can also be on a periodic basis, for example, on a weekly or even a monthly basis. Alternatively, if the central and local control centers are also linked with one or more financial data bases, of banking institutions or the like, retailers can receive credit for redeemed coupons on a daily basis.

The invention may be embodied in other specific forms without departing from the spirit or essential attributes thereof. Accordingly, reference should be made to the appended claims, rather than the foregoing specification, as indicating the scope of the invention.

What is claimed is:

1. A coupon validation network, comprising:
   at least one central control system, having means for maintaining at least two master files, the master files including a first file for all redeemable encoded coupons issued by all coupon issuers participating in the network and a second file for all coupons redeemed by each merchant participating in the network;
   a plurality of control systems, each adapted for operation by one of the merchants and having means for maintaining at least three local information files, the local information files including a first file of all the redeemable encoded coupons, a second file for all coupons redeemed by the merchant and a third file customer coupon accounts, said customer coupon accounts storing data respecting all validated redeemable coupons presented in advance for credit by individual customers, including both coupons presented in conjunction with products presented for purchase by the customer, and also coupons presented at an earlier time to be used in conjunction with potential later purchases of corresponding products to be made by the customer, said third file forming an index of coupons applicable to said individual customer;
   at least one first coupon processing terminal adapted for use in conjunction with an electronic sales register and the like and having means for effecting adjustment of a total purchase price to reflect all valid redeemed coupons and means for updating the second local database file, the at least one first coupon processing terminal including:
   means for reading coupon account cards to be carried by customers, each card having encoded means uniquely identifying a coupon customer account;
   means for reading encoded coupons presented for redemption;
   means for validating the read coupons by comparison of each of the coupons with the local information file of redeemable coupons and with each product purchased during a transaction for TM which the coupons have been presented;
   means for comparing each of the coupons in any one of the customer coupon accounts with each product purchased during a transaction for cashing-in coupons presented in advance;
   means for automatically accumulating credit values for validated coupons; and
   means for preventing subsequent revalidation of validated coupons;
   at least one second coupon processing terminal adapted for independent use by customers apart from specific purchases and sale transactions, and having means for identifying all valid coupons presented in advance for later redemption credit, and means for updating the third local information file; and,
   means for transferring data between the at least one central control system and the plurality of local control systems; and,
   means for updating the third local information file to delete cashed-in coupons and to add coupons which are presented, read and validated, but which do not correspond to any of the products purchased during the transaction;
   said control systems and said first and second coupon processing terminals further including means for allowing merchants to read, validate and redeem coupons automatically, to accumulate data facilitating accurate calculation of full potential credit values, to enable the coupon issuers to conveniently reimburse the merchants for the value of valid coupons redeemed upon purchase of corresponding products and to provide customers a means for permanently claiming credit for their coupons without carrying them, the coupons being discardable after redemption for one of purchase and credit.

2. The coupon validated network of claim 1, further comprising means for printing a list of all validated redeemed coupons.

3. The coupon validation network of claim 1, wherein the means for storing a database file of purchased products forms part of the coupon processing terminals.

4. The coupon validation network of claim 1, wherein the means for storing a database of purchased products forms part of the electronic sales register.

5. The coupon validation network of claim 1, further comprising means for selecting between more than one coupon, including coupons presented in advance and coupons presented during the transaction, which apply to the same product.

6. The coupon validation network of claim 1, wherein the at least one second coupon processing terminal further comprises means for selectively displaying and printing information from each customer's coupon account.

* * * * *